(No Model.) 2 Sheets—Sheet 1.
G. T. SMITH.
FLOUR DRESSING MACHINE.
No. 591,017. Patented Oct. 5, 1897.
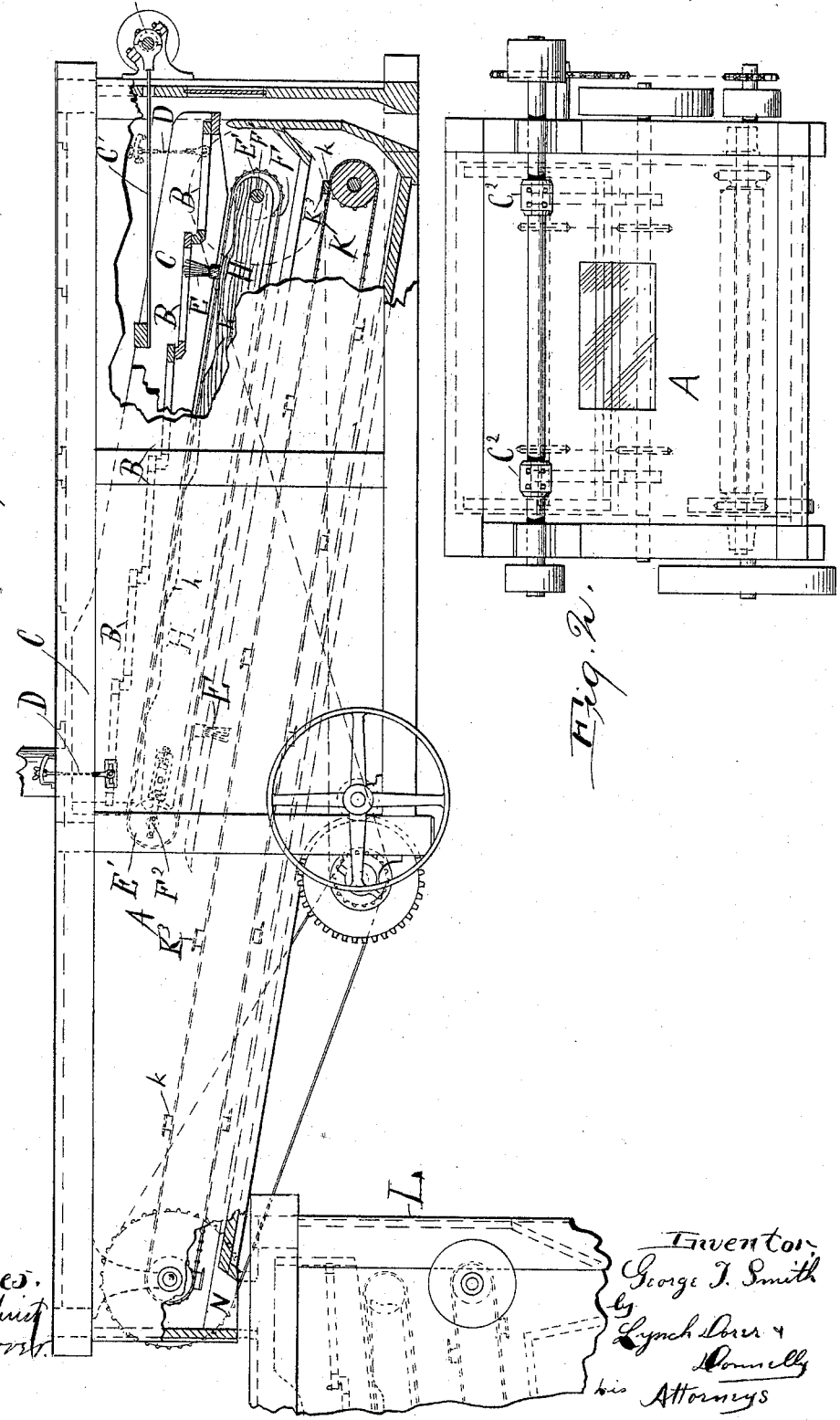
Witnesses.
E. B. Gilchrist
L. Ward Hoover
Inventor
George T. Smith
by
Lynch Dover &
Donnelly
his Attorneys
THE NORRIS PETERS CO., PHOTO-LITHO., WASHINGTON, D. C.

(No Model.) 2 Sheets—Sheet 2.
G. T. SMITH.
FLOUR DRESSING MACHINE.
No. 591,017. Patented Oct. 5, 1897.
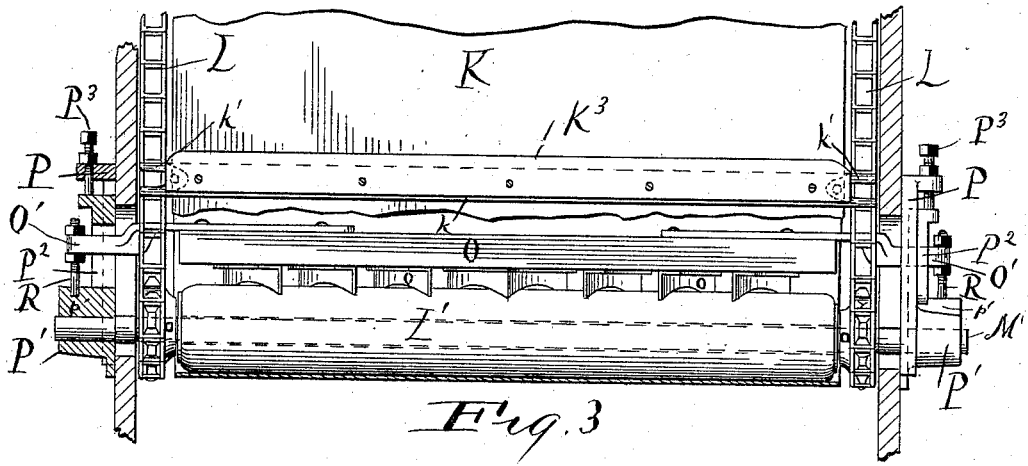
Fig. 3
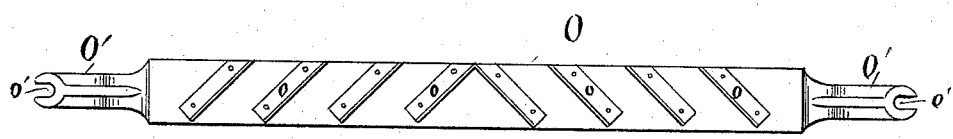
Fig. 4
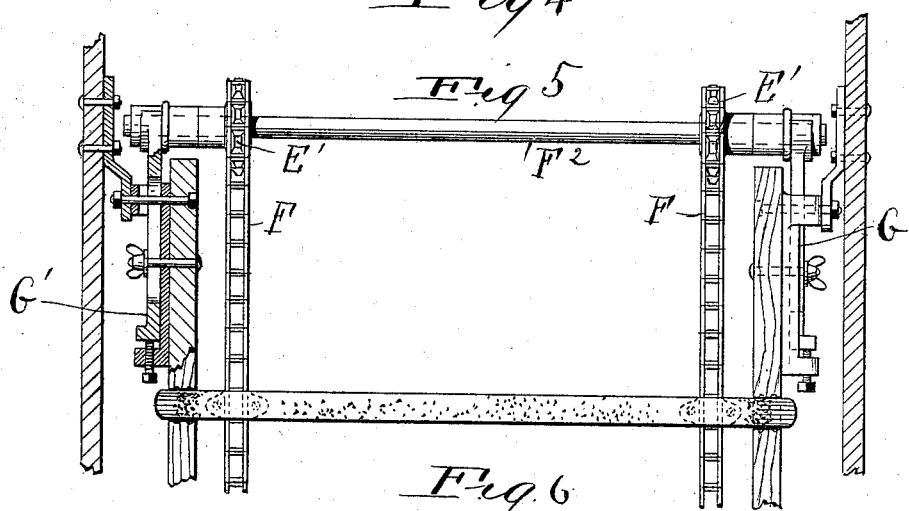
Fig. 5
Fig. 6
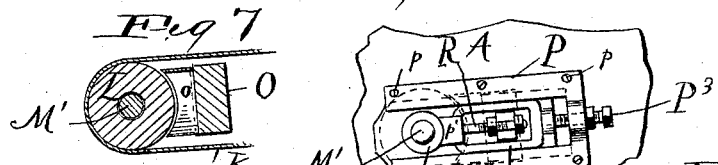
Fig. 7
Witnesses
E. B. Gilchrist
L. Ward Hoover
Inventor
George T. Smith
by Lynch Doser & Donnell
his Attorneys

UNITED STATES PATENT OFFICE.

GEORGE T. SMITH, OF CLEVELAND, OHIO, ASSIGNOR TO THE GEORGE T. SMITH MILL BUILDING COMPANY, OF SAME PLACE.

FLOUR-DRESSING MACHINE.

SPECIFICATION forming part of Letters Patent No. 591,017, dated October 5, 1897.

Application filed July 29, 1896. Serial No. 600,892. (No model.)

*To all whom it may concern:*

Be it known that I, GEORGE T. SMITH, of Cleveland, Cuyahoga county, Ohio, have invented certain new and useful Improvements in Flour-Dressing Machines; and I do hereby declare the following to be a full, clear, and exact description of the invention, such as will enable others skilled in the art to which it pertains to make and use the same.

My invention relates to flour-dressing machines which may be used either as a scalper, grader, bolter, or duster, or may be used as scalper, grader, bolter, and duster all in one and the same machine, if desired.

My invention consists in the peculiar construction of the machine and its operative parts whereby the above results are attained. It is well known to millers generally that the less the grain is handled during the making of the flour the better is the resulting product of flour, because, in the first place, the handling of the meal and the friction required in the ordinary processes heats the particles and drives off elements very essential to good flour, which are the oils, aroma, phosphates, &c., which are volatile and pass into aeriform state and are lost. In the second place, the old worm-conveyers and the long spouting not only tended to heat the meal, but caused abrasion of the meal, and hence an impalpable dust or powder was a tasteless starch, and, in the third place, the flour was not uniform in grain, as parts were granulated and parts were impalpable powder, and inasmuch as the atoms of dust yield more readily or quickly to the influence of yeast than do the larger granules it follows that the process of fermentation has gone farther in the smaller particles than in the larger, and the resultant bread is not even in grain, or what housewives call "good bread."

In my machine the grain or meal is not handled more than is absolutely necessary, because neither long spouts nor worm-conveyers are used, and the construction and operation of the machine are of such a nature that the meal is carefully handled and is made even in grain and retains when finished all the essential elements of good flour.

In the drawings, Figure 1 is a view in side elevation, partly in section, of a machine embodying my invention. Fig. 2 is a transverse vertical section taken through the end of the machine. Fig. 3 is a detached view illustrating a device for removing the flour which might collect between the conveyer-belt to one side or the other and off from said belt. Fig. 4 illustrates more clearly the construction of the cleaning device. Fig. 5 is a view in plan illustrative of the construction and operation of the cleaning-brushes. Fig. 6 is a detached view of the conveyer-roll and cleaner-adjusting device. Fig. 7 is a section taken through the conveyer-roll and cleaner, showing the blades of the cleaner in side elevation.

A represents the casing of my machine, which, as usual, incloses the operative parts of the device.

B B B B represent a series of sieves mounted in a frame C, which is in turn mounted on hangers D, so as to be free to vibrate back and forth in the casing A through the medium of spring-pitmen $C'$ $C'$ and eccentrics $C^2$ $C^2$. The sieves B B B B may be of any desired or necessary mesh and are so secured in frame C as to be located one above the other. The frame C is inclined. The object in thus locating and arranging the sieves is to provide short sections for the crushed material to pass over, and also that when passing from one sieve to the next succeeding sieve the material is shaken up and turned over and the finer particles are thus separated and fall through the meshes without being caused to tumble about and pass and repass each other, as when the ordinary revolving bolting-machine is used or where knockers are used. The construction and operation of my separator cause the meal to pass over each sieve of the series one after the other, and when passing from one sieve to the next the meal is caused to present its different sides and is not allowed to slide along the sieve in packed or clogged condition.

E E represent traveling brushes, which are mounted on endless sprocket-chains F F, which are driven or carried by sprocket-wheels $E'$ $E'$, in turn mounted on shafts $F'$ $F^2$, $F'$ being the driven shaft and $F^2$ the loose or free shaft. These brushes E E are formed long enough, so that at their ends they extend over the chains F F and engage guide-tracks H H, which are formed on their upper surfaces with steps or cams h h, so that as the brushes ride over them they are caused to accommodate themselves to the height of the several sieves and clean them. (See Figs. 1 and 2.)

J J represent guide-tracks, which engage the ends of the brushes when they pass beneath and keep the sprocket-chain from sagging too much and the brushes from coming in contact with the conveyer-belt.

K represents a conveyer-belt which is preferably an endless canvas web. This belt K is provided with stay-bars k k, secured to the belt by any suitable means, the stay-bars k k being in turn secured by means of clips k' k' to endless sprocket-chains L L. It is by means of the sprocket-chains L L that the conveyer-belt is driven, motion being given to the sprocket-chains through suitable sprocket-wheels M M, mounted on shafts M' M'.

L' L' are loose rolls around which the belt-conveyer K runs. These rolls are mounted loosely on the same shafts M' M' which carry the sprocket-wheels M M. The stay-rods are provided at their outer faces with facings K³, which overreach the sides of said rods and act as buckets to scrape up any sifted material that might pack in the front of the machine and convey all the sifted material backward to a hopper N, from whence it is fed to another series of sieves and acted upon in like manner, or it may pass through the hopper to another roll and be again reduced. The series of sieves may be made "two high," "three high," or more or less, and the machine thus made to act as a grader and bolter or as a scalper, grader, bolter, and duster, according to the number of compartments used.

O represents what I call a "stationary" belt and roller cleaning device, which consists of a bar having inclined wings o o secured thereto, one series of wings being inclined in one direction and the other series being inclined in an opposite direction. These wings o o act to guide the flour which may fall between the conveyer-belts to one side or the other as it passes between the roller and belt and drops on said wings. In order to tighten or adjust the belt-conveyer, I have provided an adjusting device, (shown more clearly in Figs. 3 and 6,) one on each side of the machine, which consists of a housing or frame P, secured to the outside of casing A by means of screws or bolts p. Mounted in the housing of frame P is the journal P', (of shaft M',) which is provided with a yoke P², which slides in housing P and is adjusted by means of set-screw P³. Projecting through the yokes P² P² at either side of the machine are the ends O' O' of cleaner O, formed with opened slots o' o' for the reception of the threaded ends of bolts R R, the other ends of said bolts being embedded in the ends p' of the yoke, as shown more clearly in Fig. 3 to the left of the figure. The manner of adjusting the cleaner O in relation to the roll L' is by adjusting-nuts R R'. By the above-described construction of adjusting device the roller L' and its cleaner are both moved together and are always in adjustment one with the other. In order to keep the brush-carrying sprocket-chains F F taut, adjusting devices G G' are provided at either side, in which are journaled the ends of the loose or free shaft F². It will be seen that with the arrangement whereby the conveyer-belt K is secured directly to the sprocket-chains L L the said belt is driven positively and cannot slip or slide on the rollers, and hence it remains in place and needs no watching, as in the case of ordinary conveyer-belts where they depend upon friction between the rolls and belt for driving power.

What I claim is—

1. In a separator of the class described, the combination with a series of sieves located at different heights, of an endless belt or chain carrying brushes, said brushes being guided on their way across the machine and in contact with said sieves by guide-strips provided with steps or cams corresponding with the location of the sieves, said cams being in such location and juxtaposition as to keep the brushes in contact with the several sieves as said brushes travel along, substantially as shown and described.

2. In a separator of the class described, the combination with the conveyer-belt, of rolls over which said belt passes and a cleaner adjustable to one of said rolls and having oppositely-inclined wings substantially as and for the purpose described.

3. A cleaner for conveyer-belts and rollers consisting of a bar provided with inclined wings, said bar with its wings being located between the conveying-belt and in such juxtaposition to the roll as to receive the material dropping from the belt and convey it to either side, substantially as shown and described.

4. In a separator having a conveyer-belt and rolls for guiding the same, the combination with said rolls, of a cleaner inclosed above and below by said conveyer-belt and having oppositely-inclined wings, and an adjusting device substantially such as described whereby the cleaner and roller may be adjusted independently one of the other, substantially as shown and described.

In testimony whereof I sign this specification, in the presence of two witnesses, this 29th day of June, 1896.

GEORGE T. SMITH.

Witnesses:
W. E. DONNELLY,
ELLA E. TILDEN.